US011459481B2

(12) United States Patent
Newbloom et al.

(10) Patent No.: US 11,459,481 B2
(45) Date of Patent: Oct. 4, 2022

(54) THERMAL SPRAY FOR DURABLE AND LARGE-AREA HYDROPHOBIC AND SUPERHYDROPHOBIC/ICEPHOBIC COATINGS

(71) Applicant: The Boeing Company, Chicago, IL (US)

(72) Inventors: Gregory M. Newbloom, Seattle, WA (US); William A. Thompson, Seattle, WA (US); Marc J. Froning, Seattle, WA (US); Arash Ghabchi, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 951 days.

(21) Appl. No.: 14/508,846

(22) Filed: Oct. 7, 2014

(65) Prior Publication Data

US 2016/0096972 A1   Apr. 7, 2016

(51) Int. Cl.
*B05D 1/10* (2006.01)
*C23C 4/129* (2016.01)
(Continued)

(52) U.S. Cl.
CPC ............. *C09D 161/02* (2013.01); *B05D 1/10* (2013.01); *B05D 5/08* (2013.01); *C09D 127/18* (2013.01);
(Continued)

(58) Field of Classification Search
CPC .... C09D 161/02; C09D 127/18; C23C 4/122; C23C 4/005; C23C 4/04; C23C 4/105;
(Continued)

(56) References Cited

U.S. PATENT DOCUMENTS 5,716,422 A * 2/1998 Muffoletto ............... C23C 4/04
                                                       204/242
6,136,453 A * 10/2000 Ritter ..................... C23C 4/02
                                                       428/612
(Continued)

FOREIGN PATENT DOCUMENTS

EP    0988898 A2   3/2000
EP    3006590 A1   4/2016
(Continued)

OTHER PUBLICATIONS

"Introduction to Thermal Spray Technology and Surface Science", in Handbook of Thermal Spray Technology, J.R. Davis, editor, 2004, pp. 3-13.*
(Continued)

*Primary Examiner* — Katherine A Bareford
(74) *Attorney, Agent, or Firm* — Quinn IP Law (57) ABSTRACT

A method for forming a hydrophobic coating on a substrate by a thermal spray deposition process is described. The method may comprise feeding a thermal spray apparatus with a coating precursor consisting of particles having an initial particle morphology, and heating the particles with the thermal spray apparatus to cause the particle to at least partially melt. The method may further comprise accelerating the particles towards the substrate, and forming the hydrophobic coating on the substrate by allowing the particles to impact the substrate in a partially melted state in which a fraction of the initial particle morphology of at least some of the particles is retained.

15 Claims, 10 Drawing Sheets

(51) Int. Cl.
  *C09D 161/02* (2006.01)
  *C09D 127/18* (2006.01)
  *C23C 4/04* (2006.01)
  *B05D 5/08* (2006.01)
  *C23C 4/11* (2016.01)
  *C23C 4/126* (2016.01)
  *C23C 4/01* (2016.01)

(52) U.S. Cl.
  CPC ................. *C23C 4/01* (2016.01); *C23C 4/04* (2013.01); *C23C 4/11* (2016.01); *C23C 4/126* (2016.01); *C23C 4/129* (2016.01); *B05D 5/083* (2013.01)

(58) Field of Classification Search
  CPC .. C23C 4/01; C23C 4/11; C23C 4/126; C23C 4/129; B05D 5/08; B05D 5/083; B05D 1/10
  USPC ........................................................ 427/447
  See application file for complete search history.

(56) References Cited

U.S. PATENT DOCUMENTS

| | | | |
|---|---|---|---|
| 6,327,452 B1 * | 12/2001 | Jaskowiak | G03G 15/0818 399/286 |
| 6,660,363 B1 | 12/2003 | Barthlott | |
| 2002/0018860 A1 * | 2/2002 | Filippou | B05D 3/08 427/532 |
| 2004/0202886 A1 * | 10/2004 | Subramanian | C23C 4/18 428/632 |
| 2006/0121284 A1 * | 6/2006 | Held | C08J 7/047 428/411.1 |
| 2006/0246297 A1 * | 11/2006 | Sakoske | C03C 17/04 428/426 |
| 2006/0263516 A1 * | 11/2006 | Jones | C03C 17/007 427/180 |
| 2007/0173590 A1 | 7/2007 | Longo et al. | |
| 2008/0311382 A1 | 12/2008 | Stecher | |
| 2010/0107982 A1 * | 5/2010 | Sato | C23C 4/00 118/726 |
| 2011/0197928 A1 * | 8/2011 | O'Donnell | H01L 21/67051 134/26 |
| 2013/0017401 A1 * | 1/2013 | Rehage | B05D 1/08 428/457 |
| 2014/0127516 A1 | 5/2014 | Wang et al. | |
| 2014/0178641 A1 | 6/2014 | Leblanc et al. | |
| 2014/0251501 A1 * | 9/2014 | Kang | C23C 28/02 148/222 |
| 2016/0096972 A1 | 4/2016 | Newbloom et al. | |

FOREIGN PATENT DOCUMENTS

| | | |
|---|---|---|
| JP | H02217458 A | 8/1990 |
| JP | 2000096203 A | 4/2000 |
| JP | 2006083279 A | 3/2006 |
| WO | 2006115558 A2 | 11/2006 |
| WO | 2010092191 A2 | 8/2010 |
| WO | 2014099088 A2 | 6/2014 |

OTHER PUBLICATIONS

"Thermal Spraying:Practice, Theory, and Application", Amercian Welding Society, Inc., 1985, p. 42.*
Li, et al. "Modeling and Control of High-Velocity Oxygen-Fuel (HVOF) Thermal Spray: A Tutorial Review", Journal of Thermal Spray Technology, vol. 18(5-6) Mid-Dec. 2009, pp. 753-768.*
Li, et al. "Modelling and Control of High-Velocity Oxygen-Fuel (HVOF) Thermal Spray: A Tutorial Review", Journal of Thermal Spray Technology, vol. 18(5-6) Mid-Dec. 2009, pp. 753-768. (Year: 2009).*
Introduction to Thermal Spray Processing, Handbook of Thermal Spray Technology, ASM International, 2004, pp. 3-13. (Year: 2004).*
International Search Report and Written Opinion for related International Application No. EP15185897; report dated Feb. 18, 2016.
Patel K et al: "Effect of surface roughness parameters on thermally sprayed PEEK coatings", Surface and Coatings Technology, vol. 204, No. 21-22, Apr. 18, 2010 (Apr. 18, 2010), pp. 3567-3572, XP055249113, Elsevier Science [CH] ISSN: 0257-8972, DOI: 10.1016/j.surfcoat.2010.04.026.
Silakoop N et al: "Wear Resistance of Poly(ether-etherketone)/ Polytetrafluoroethylene Composite Coating", 2nd Polymer Conference of Thailand (PCT2), Oct. 20-21, 2011, Convention Center, Chulabhorn Research Institute, Bangkok [TH], vol. PI-OP-10, Oct. 20, (Oct. 20, 2011), pp. 92-95, XP055249027, Polymer Society of Thailand, Bangkok [TH].
Examination Search Report for related Canadian Application No. EP15185897; report dated Feb. 18, 2016.
Search Report for related European Application No. EP15185897.4; report dated Jul. 18, 2018.
Search Report for related Canadian Application No. 2897696; report dated Mar. 14, 2019.
Office Action for related Japanese Application No. 2015-142860; report dated May 20, 2019.
Office Action for related European Application No. 15185897.4; report dated Nov. 12, 2019.
Office Action for related Japanese Application No. 2015-142860; report dated Nov. 5, 2019.

* cited by examiner

THERMAL SPRAY FOR DURABLE AND LARGE-AREA HYDROPHOBIC AND SUPERHYDROPHOBIC/ICEPHOBIC COATINGS

FIELD OF THE DISCLOSURE

The present disclosure generally relates to hydrophobic and superhydrophobic/icephobic coatings, and more specifically, relates to methods for producing hydrophobic and superhydrophobic/icephobic coatings on substrate surfaces using thermal spray techniques.

BACKGROUND

The development of durable hydrophobic and superhydrophobic/icephobic coatings is of great interest to numerous industries, such as aerospace, marine, power, transportation, construction, and defense industries. The ability of hydrophobic and superhydrophobic/icephobic coatings to repel water and ice may impart coated components with advantageous properties such as resistance to wetting, corrosion, swelling, rotting, cracking, and fouling. For example, hydrophobic coatings applied to ship hulls may reduce friction in water and improve efficiency, while superhydrophobic/icephobic coatings on high voltage and telephone wires may assist in preventing ice build-up on power and communication lines during winter storms.

The hydrophobicity and superhydrophobicity/icephobicity of a coating is characterized by the water contact angle ($\theta$) of the coating, which is the angle at which a water droplet contacts the surface of the coating. Coatings that have a water contact angle ($\theta$) of below 90° are characterized as hydrophilic, while coatings that have a water contact angle ($\theta$) of greater than 90° are characterized as hydrophobic (or water-repelling). If the water contact angle ($\theta$) of a coating is 150° or more, the coating is still hydrophobic but is characterized as "superhydrophobic" and will likely have icephobic (or ice-repelling) properties as well.

Several methods for generating hydrophobic and superhydrophobic/icephobic coatings have been reported in the literature. For example, superhydrophobic and anti-icing coatings have been produced using a thermal spray process to deposit a base coating which is used as a binder for silicon-based particles that impose the coating with superhydrophobic properties. However, many existing hydrophobic and superhydrophobic/icephobic coatings suffer from drawbacks such as poor substrate adhesion and poor coating durability. Moreover, some methods for applying hydrophobic and superhydrophobic/icephobic coatings may be limited to lab-scale quantities as the methods may rely on vacuum conditions or specialized techniques such as magnetron sputtering or electrodeposition.

Thus, there are challenges and limitations of existing art that are to be overcome. While the above described systems for producing hydrophobic and superhydrophobic/icephobic coatings are effective, it is desirable to improve these techniques for applications on larger parts with large surface areas and/or parts with diverse shapes under atmospheric conditions. In addition, it is desirable to improve the substrate adhesion and durability of hydrophobic and superhydrophobic/icephobic coatings.

SUMMARY

Disclosed herein are methods for producing durable hydrophobic and superhydrophobic/icephobic coatings on a variety of substrates, including large substrates, under atmospheric conditions. In accordance with one aspect of the present disclosure, a method for forming a hydrophobic coating on a substrate by a thermal spray deposition process is disclosed. The method may comprise feeding a thermal spray apparatus with a coating precursor which may include particles having an initial particle morphology. The method may further comprise heating the particles with the thermal spray apparatus to cause the particles to at least partially melt, and accelerating the particles towards the substrate using the thermal spray apparatus. In addition, the method may further comprise forming the hydrophobic coating on the substrate by allowing the particles to impact the substrate in a partially melted state in which a fraction of the initial particle morphology of at least some of the particles is retained.

In accordance with another aspect of the present disclosure, an article including a substrate and a hydrophobic coating applied to a surface of the substrate is disclosed. The hydrophobic coating may be applied to the surface of the substrate by a thermal spray deposition process comprising: 1) feeding a thermal spray apparatus with a coating precursor which may include particles having an initial particle morphology, 2) heating the particles with the thermal spray apparatus to cause the particles to at least partially melt, 3) accelerating the particles towards the substrate using the thermal spray apparatus, and 4) forming the hydrophobic coating on the substrate by allowing the particles to impact the substrate in a partially melted state in which at least a fraction of the initial particle morphology of at least some of the particles is retained.

In accordance with another aspect of the present disclosure, an article is disclosed. The article may comprise a substrate having a surface, and a hydrophobic coating applied to the surface of the substrate. The hydrophobic coating may have an average roughness of between about 1 nanometer and about 100 micrometers, and the hydrophobic coating may be produced by depositing partially melted particles on the surface of the substrate by a thermal spray deposition process.

The features, functions, and advantages that have been discussed can be achieved independently in various embodiments or may be combined in yet other embodiments further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
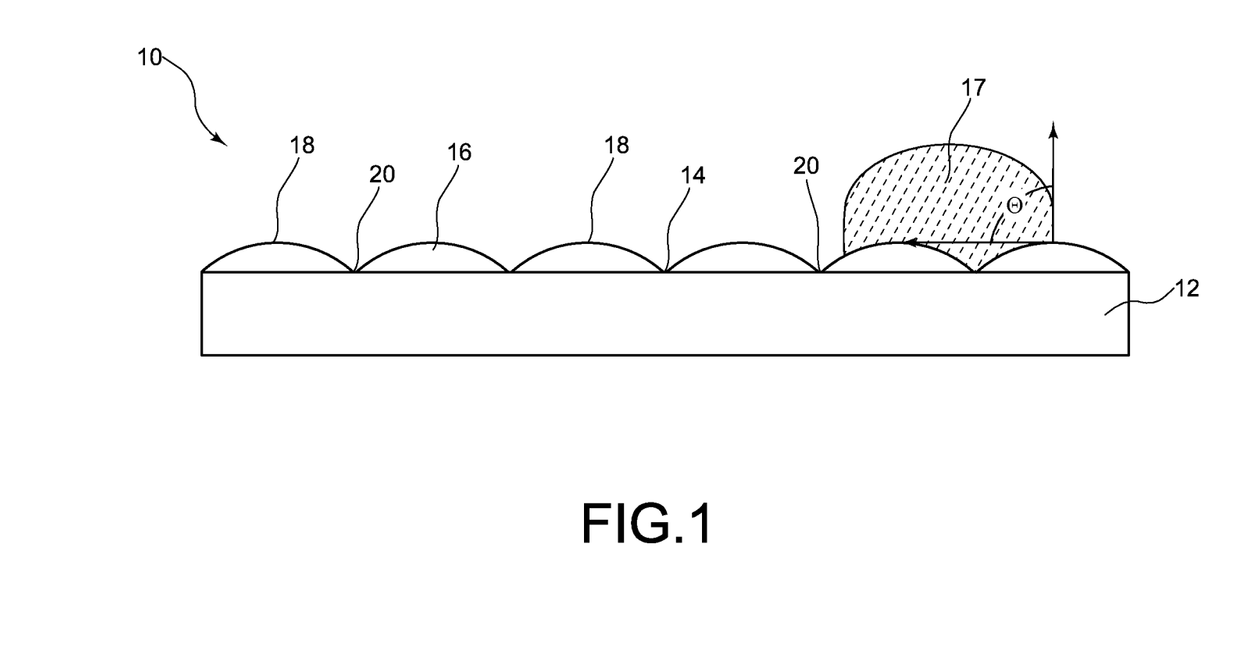
FIG. 1 is a schematic representation of a hydrophobic coating deposited on a substrate and having a water contact angle ($\theta$) with a water droplet, constructed in accordance with the present disclosure.

Referring now to the drawings, and with specific reference to FIG. 1, an article 10 including a substrate 12 having a surface 14 to which a hydrophobic coating 16 is applied is shown. The hydrophobic coating 16 may exhibit a water contact angle (θ) with a water droplet 17 of 90° or more. In some circumstances, the water contact angle (θ) of the hydrophobic coating 16 may exceed 150°, in which case the hydrophobic coating 16 may may be superhydrophobic/icephobic as well. Therefore, although termed "hydrophobic", it will be understood that the hydrophobic coating 16 may also exhibit superhydrophobic/icephobic properties depending on the magnitude of its water contact angle (θ).

As a non-limiting example, the article 10 may be a commercial aircraft wing, and the surface 14 may be a leading edge of the commercial aircraft wing. In this example, the hydrophobic coating 16 may protect the leading edge of the wing from ice buildup, and may reduce or eliminate the need for wiring used to actively heat the leading edge. Alternatively, the article 10 may be any other type of part which may benefit from hydrophobic and/or superhydrophobic/icephobic properties such as, but not limited to, a telephone or power wire, a pipe, a bridge, or various types of marine equipment.

The hydrophobic coating 16 may have a roughened surface which may at least partially contribute to the hydrophobicity of the hydrophobic coating 16. This is because air molecules, which are highly hydrophobic, may become entrapped in the protruding surface structures of a roughened surface and repel water and ice. Specifically, the hydrophobic coating 16 may include peaks 18 and valleys 20 along the surface of the coating, thereby creating a roughened surface. In general, the average roughness ($R_a$) (or the average length between the peaks 18 and the valleys 20) of the hydrophobic coating 16 may be dependent on the diameter of the smallest particles forming the coating 16. For example, the average roughness ($R_a$) of the hydrophobic coating 16 may range from about 1 nanometer to about 500 micrometers, or from about 1 nanometer to about 100 micrometers, but may extend well beyond this range such as into the subnanometer or millimeter range as well. In some circumstances, the hydrophobic coating 16 may exhibit multi-length scale surface roughness in which the distance between the peaks 18 and the valleys 20 may vary by at least one order of magnitude (e.g., from nanoscale to microscale). Such multi-length scale surface roughness may be particularly advantageous for enhancing the hydrophobic or superhydrophobic/icephobic effect of the coating 16.

The substrate 12 may be formed from a range of materials such as, but not limited to, polymers, composites, metals, metal alloys, ceramics, cermets, and combinations thereof. In addition, the hydrophobic coating 16 may be formed from one or more polymers, carbon, metals, metal alloys, composites, nanoparticles, and combinations thereof. Notably, the hydrophobic coating 16 may be applied to the surface 14 of the substrate 12 by a thermal spray deposition process such as high velocity oxy-fuel coating spraying (HVOF), plasma spraying, detonation spraying, wire arc spraying, flame spraying, warm spraying, and cold spraying, or any other type of thermal spray deposition process apparent to those with ordinary skill in the art. The thermal spray deposition parameters may be adjusted to tune the degree of melting of the particles forming the hydrophobic coating 16 in order to control the degree of surface roughness/hydrophobicity of the resulting coating as well as the strength of adhesion of the hydrophobic coating 16 to the surface 14 (see further details below). Specifically, the higher the degree of melting of the particles, the more the particles will flatten and flow freely to adhere to the substrate 12 and provide a durable coating. In contrast, the lower the degree of melting of the particles, the more the particles will retain their initial particle morphology and provide a more roughened/hydrophobic surface. Thus, the thermal spray deposition parameters may be adjusted as necessary to arrive at a suitable or optimal degree of particle melting to balance substrate adhesion and surface roughness (see further details below). Moreover, the thermal spray deposition process may be performed under atmospheric conditions and may be used to apply the hydrophobic coating 16 over a range of substrates at high deposition rates, including substrates having large surface areas (>>1 m$^2$) and/or surfaces with curved and/or irregular shapes.

Figure 2:
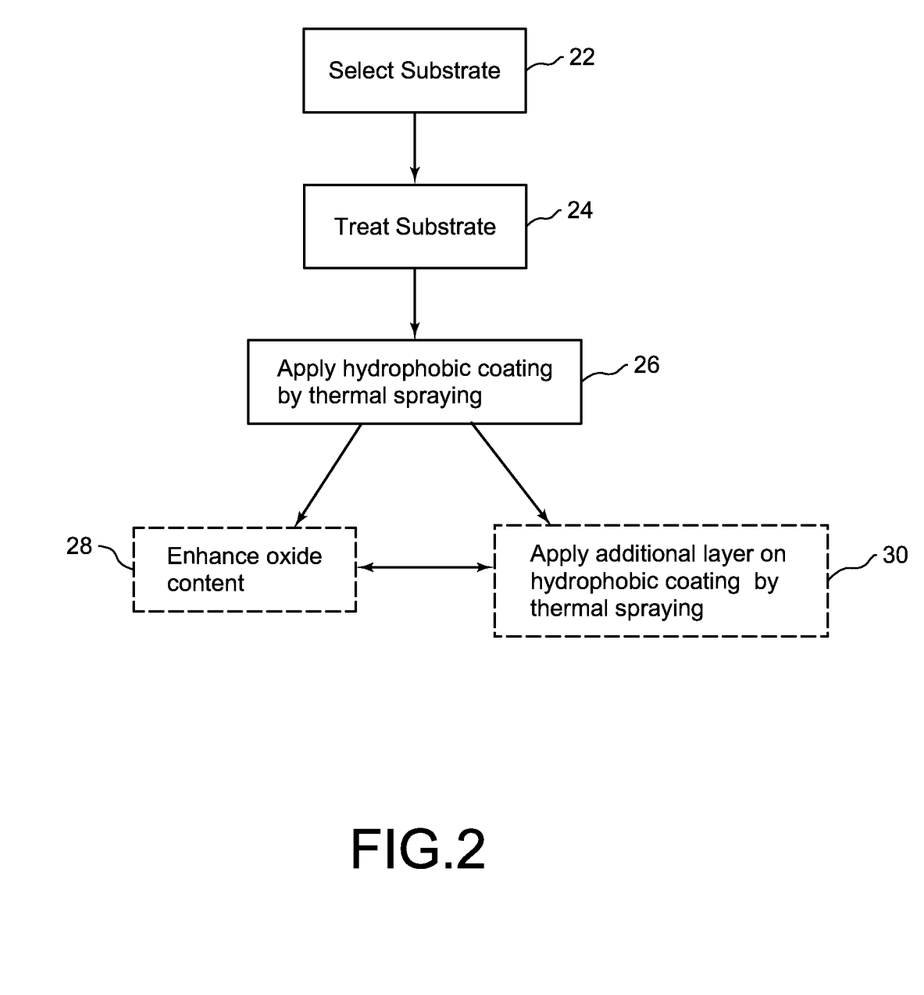
FIG. 2 is a flowchart illustrating a sequence of steps which may be involved in producing the hydrophobic coating on the substrate, in accordance with a method the present disclosure.

A general overview of a method which may be used to produce the article 10 is depicted in FIG. 2. Beginning with a first block 22, the substrate 12 may be selected from a range of products formed from a range of materials (e.g., polymers, metals, composites, ceramics, cermets, etc.) depending on the application of the article 10. However, it is noted that the thermal spraying conditions may limit the selection of the substrate in some circumstances. For example, certain polymeric substrates may melt at the high temperature conditions required to melt or partially melt certain metal-based particles. Once the substrate is selected, the surface 14 of the substrate may be optionally treated to roughen the surface 14 and promote coating adhesion according to an optional block 24. Roughening of the surface 14 may be achieved by mechanical roughening (e.g., grit blasting) or by chemical roughening, such as by surface etching with solvent exposure.

The hydrophobic coating 16 may then be applied to the surface 14 of the treated or untreated substrate 12 by thermal spraying according to a next block 26, as shown. As described in further detail below, the parameters used for the thermal spray deposition may be tuned as needed to control the degree of melting of the particles forming the hydrophobic coating 16, and, therefore, the hydrophobicity and durability of the resulting hydrophobic coating 16. In some cases, the substrate 12 may be optionally heated or cooled prior to, during, or after the deposition of the hydrophobic coating 16 to further control the degree of melting of the particles. Once produced, the hydrophobicity of the coating may optionally be enhanced by enhancing an oxide content of the coating (optional block 28) to lower the surface energy of the coating, as lower surface energy coating materials (e.g., oxides, etc.) tend to increase the water contact angle ($\theta$) of a coating. As a non-limiting possibility, the oxide content of the hydrophobic coating 16 may be increased by passing a flame over the top layer of the coating without substantially melting the coating, although other methods may also be used.

In addition to the above, the hydrophobicity of the hydrophobic coating 16 may optionally be increased by applying one or more additional layers over the hydrophobic coating 16 according to an optional block 30. The additional layer(s) may be generated from particles having a lower surface energy and/or a smaller size than the particles used to generate the hydrophobic coating 16, thereby lowering the surface energy and/or increasing the degree of multi-length scale roughness of the final coating. In contrast to the hydrophobic coating 16, which may be formed from multiple layers of particles, the additional layer(s) may each be a thin, single particle layer (e.g., a monolayer) (see FIGS. 8-9 and further details below).

As yet a further possibility, the hydrophobicity of the hydrophobic coating 16 may be enhanced by performing a combination of the optional blocks 28 and 30, as shown. If the hydrophobic coating 16 is not yet hydrophobic or superhydrophobic/icephobic upon completion of the block 26, treating the hydrophobic coating 16 according to the block 28 and/or the block 30 may boost the hydrophobicity of the coating 16 to a hydrophobic state (i.e., a water contact angle ($\theta$) of 90° or more) or even a superhydrophobic/icephobic state (i.e., a water content angle ($\theta$) of 150° or more).

Figure 3:
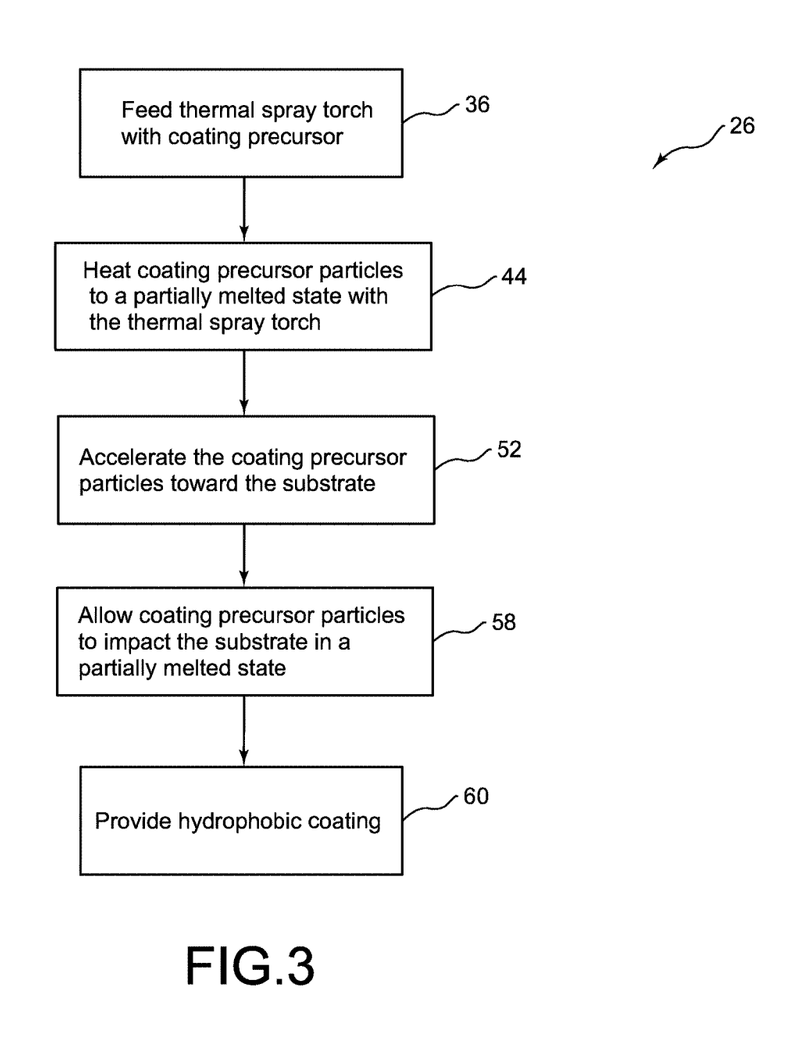
FIG. 3 is a flowchart illustrating a sequence of steps which may be involved in depositing the hydrophobic coating on the substrate by a thermal spray deposition process, in accordance with a method of the present disclosure.
Figure 4:
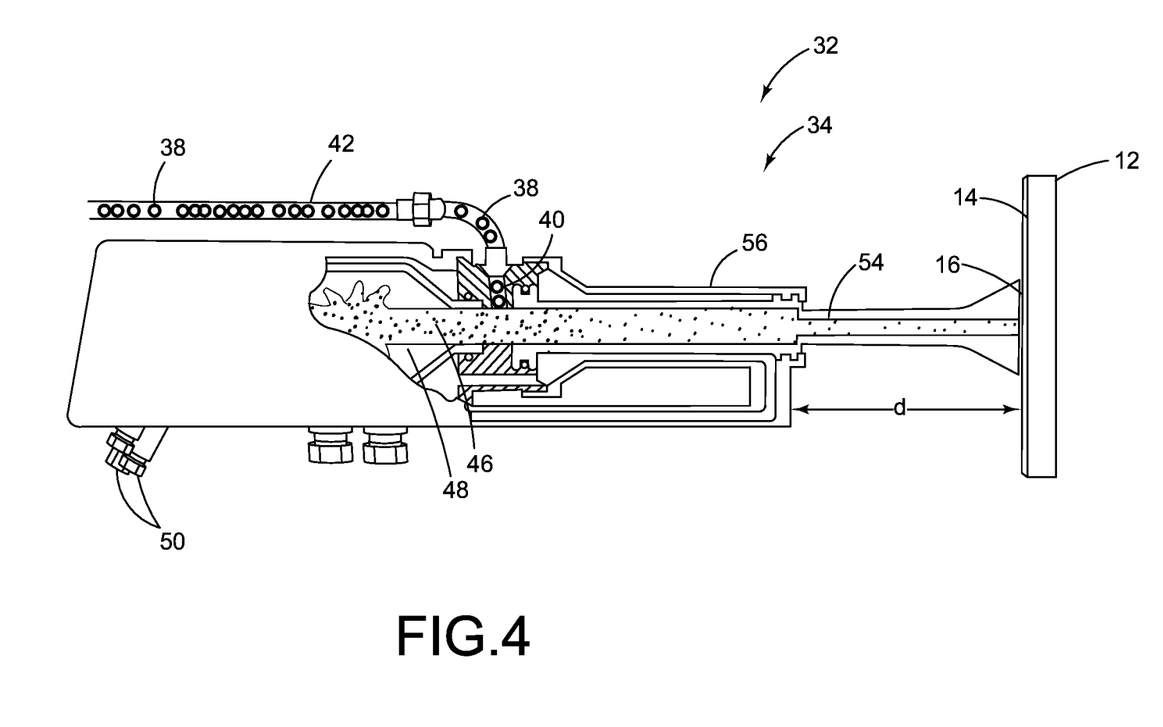
FIG. 4 is partial, cross-sectional view of a thermal spray apparatus which may be used to carry out the thermal spray deposition process of FIG. 3, in accordance with a method of the present disclosure.

Turning now to FIGS. 3 and 4, a method for carrying out the block 26 using a thermal spray apparatus 32 is shown. The thermal spray apparatus 32 may be a thermal spray torch 34 such as an HVOF spray torch, although other types of thermal spray deposition equipment may also be used such as plasma spray torchs, flame powder or flame wire spray torchs, or any other type of thermal spray equipment apparent to those with ordinary skill in the art. Beginning with a block 36, a coating precursor 38 may be fed into the thermal spray torch 34, as shown. For example, the coating precursor 38 may be fed into the thermal spray torch 34 through an injector 40, with a feed line 42 providing the supply of the coating precursor 38 to the injector 40 (see FIG. 4). The coating precursor 38 may be in the form of a powder consisting of particles having an initial particle size and morphology. In accordance with the present disclosure, the term "morphology" refers to the shape of the particle. The average particle sizes of the powder may range from about 10 nanometers to about 100 micrometers, although particle sizes outside of this range may also be used in some circumstances. Alternatively, the coating precursor 38 may be in the form of a wire or a rod.

The coating precursor 38 may then be heated to at least a partially melted state with the thermal spray torch according to a next block 44. More specifically, at least some of the particles of the coating precursor 38 may be at least partially melted to promote the adhesion of the particles to the surface 14. In addition, at least some of the particles of the coating precursor 38 may be partially melted or fully unmelted such that the particles retain at least a fraction of their initial morphology to produce a rough surface upon impact with the substrate 12. If the thermal spray torch 34 is a HVOF type torch, heating of the coating precursor 38 may be achieved by injecting the particles into a gas stream 46 exiting an outlet of a combustion chamber 48 of the torch 34, as shown in FIG. 4. Control over the degree of melting of the particles of the coating precursor 38 during the block 44 may be achieved by adjusting the temperature of the gas stream 46 by tuning various thermal spray deposition parameters, such as the fuel-to-oxygen ratio, the total volume of fuel and oxygen, and/or the feed rates of fuel and oxygen fed into the combustion chamber 48 from oxygen/fuel supply lines 50 (see FIG. 4). Using HVOF thermal spraying, hydrophobic coatings may be produced using fuel-to-oxygen ratios of between about 0.5 to about 0.9, fuel feed rates of between about 1.5 to about 2.2 gallons per hour (GPH), and oxygen feed rates of between about 600 to about 900 standard cubic feet per hour (SCFH). However, it will be understood that the thermal spray parameters may deviate significantly from these ranges depending on a number of factors in practice such as, but not limited to, particle type, substrate type, and the type of thermal spray equipment used.

The selection of the thermal spray parameters may take the thermal mass(es) (i.e., the energy required to melt) of the particles forming the coating precursor 38 into account, and the thermal mass(es) of the particles may be a function of the size, surface area, and porosity of the particles making up the coating precursor 38. In addition, if the coating precursor 38 is formed from a mixture of particle types, the relative degree of melting of the different particles may also be tuned, at least to a degree, by varying the above parameters. It is also noted that if the coating precursor 38 contains polymeric particles, lower fuel-to-oxygen ratios (e.g., <1) may be used to prevent complete melting and/or burning of the polymeric particles.

Following the block 44, the at least partially melted coating precursor particles may then be accelerated towards the surface 14 of the substrate 12 according to a next block 52. More specifically, the coating precursor particles may be accelerated toward the substrate 12 in a spray jet 54 flowing out of a nozzle 56 of the thermal spray torch 34, as shown in FIG. 4. According to a next block 58, the coating precursor particles may then be allowed to impact the substrate 12 in a partially melted state in which a fraction of the initial particle morphology of at least some of the particles of the coating precursor 38 is retained. The retained initial particle morphology may be correlated with the roughness (e.g., average roughness ($R_a$), etc.) of the resulting hydrophobic coating 16, with smaller roughnesses compared to the initial particle size correlating with lower fractions of retained particle morphologies. Following the block 58, the hydrophobic coating 16 may be provided according to a next block 60.

A stand-off distance (d) between the thermal spray torch 34 and the substrate 12 may be varied during the blocks 52, 58, and 60 to regulate the amount of heating of the hydrophobic coating 16 and the substrate 12, with smaller stand-off distances (d) tending to cause increased heating of the hydrophobic coating/substrate as well as increased oxide contents in the hydrophobic coating 16. Greater stand-off distances (d) may allow the particles exiting the thermal spray torch 34 to at least partially unmelt and reach a more hardened state, thereby producing a more rough/hydrophobic surface upon impact with the substrate 12. In general, applicants have produced hydrophobic coatings with HVOF thermal spraying using stand-off distances (d) in the range of about 3 inches to about 17 inches. However, stand-off distances (d) outside of this range may certainly be used in some circumstances depending on various factors such as, but not limited to, particle type, substrate type, other thermal spray settings, and the type of thermal spray equipment used.

In addition, a raster speed at which the thermal spray torch 34 is passed over the substrate 12 may also be varied during the blocks 52, 58, and 60 to regulate the degree of heating of the hydrophobic coating/substrate, with faster raster speeds reducing the degree of heating of the hydrophobic coating/substrate. Using HVOF thermal spraying, applicants have employed raster speeds in the range of about 900 millimeters per second to about 1100 millimeters per second to produce hydrophobic coatings. However, raster speeds outside of this range may certainly be used in some circumstances depending on various factors such as, but not limited to, particle type, substrate type, other thermal spray settings, and/or the type of thermal spray equipment used.

Figure 5:
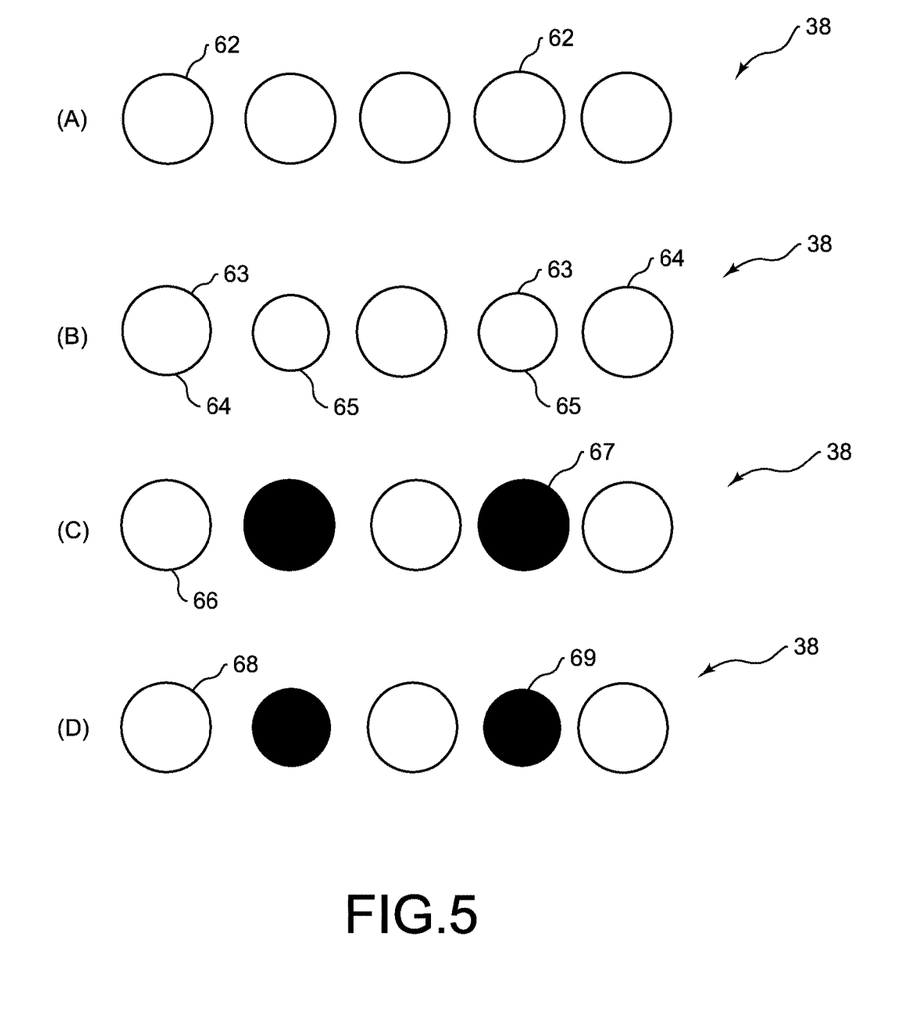
FIG. 5 is a schematic representation of different coating precursor compositions which may be used to produce the hydrophobic coating of FIG. 1, constructed in accordance with the present disclosure.

FIG. 5 provides a schematic representation of different particle compositions for which may be used as the coating precursor 38. Beginning with coating precursor (A), it may consist of particles of a single component 62 having a single chemical identity and a single particle size and particle morphology. In this case, the component 62 may not fully melt during the thermal spray deposition process to ensure that at least some of the particles retain at least a fraction of their initial particle morphology upon impact with the substrate 12 to produce surface roughness. However, at least some of the particles of the component 62 may at least partially melt to ensure that the particles suitably adhere to the substrate 12.

In coating precursor composition (B), the coating precursor 38 may consist of a single component 63 having a single chemical identity, but with different particle sizes and particle morphologies. More specifically, the single component 63 may consist of a primary component 64 present at more than 50 weight percent and having a larger thermal mass (e.g., larger radius, less porous, and/or lower surface area, etc.) than a secondary component 65, such that the primary component 64 may require more energy/heat to melt. During the thermal spray deposition process, the primary component 64 may remain fully unmelted to promote surface roughness, provided that at least some of the particles of the secondary component 65 are at least partially melted to promote surface adhesion. Alternatively, the primary component 64 and the secondary component 65 may both be heated to partially melted states in which both the primary component 64 and the secondary component 65 may contribute to surface roughness, perhaps even multi-length scale surface roughness. In this regard, multi-length scale surface roughness in hydrophobic coatings produced using coating precursor composition (B) may result from the different particle sizes of the primary component 64 and the secondary component 65 and/or the relative degrees of melting of the primary component 64 and the secondary component 65. It will be understood that coating precursor composition (B) may further include additional components with the same chemical identity but having different particle sizes and/or particle morphologies.

In coating precursor composition (C), the coating precursor 38 may consist of a mixture of two or more components having different chemical identities but the same particle size and particle morphology. For example, the coating precursor composition (C) may include a primary component 66 present at more than 50 weight percent and a secondary component 67 present at less than 50 weight percent, although additional components may also be included. The primary component 66 may impart mechanical properties to the resulting hydrophobic coating 16 (e.g., hardness, fracture toughness, elastic modulus, surface adhesion, durability, wear resistance, etc.), while the secondary component 67 may impart hydrophobic and superhydrophobic/icephobic properties to the hydrophobic coating 16 (e.g., lower surface energy, roughness, etc.). Therefore, during the thermal spray deposition process, the primary component 66 may be at least partially melted to promote surface adhesion, while the secondary component 67 may be at least partially unmelted so that it retains at least a fraction of its initial morphology and creates a rough/hydrophobic surface. However, in some circumstances, both the primary component 66 and the secondary component 67 may contribute varying degrees of mechanical properties and hydrophobic properties to the hydrophobic coating 16. As the primary component 66 and the secondary component 67 may have the same particle size and particle morphology, any multi-length scale surface roughness in hydrophobic coatings produced using coating precursor composition (C) may result from the relative degrees of melting of the primary component 66 and the secondary component 67.

The particles of coating precursor composition (D) may include a mixture of two or more components having different chemical identities and different particle sizes and particle morphologies. For example, coating precursor composition (D) may include a primary component 68 present at more than 50 weight percent and having a different chemical identity and particle size/morphology than a secondary component 69, although more than two components may also be used. The primary component 68 and the secondary component 69 may impart either mechanical properties (e.g., hardness, fracture toughness, elastic modulus, surface adhesion, durability, wear resistance, etc.) or hydrophobic properties (e.g., roughness, lower surface energy, etc.) to the hydrophobic coating 16. In the case where the primary component 68 imparts mechanical properties and the secondary component 69 imparts hydrophobic properties, the primary component 68 may be at least partially melted by the thermal spray deposition process to ensure that it sufficiently adheres to the substrate 12 and contributes to the durability of the resulting hydrophobic coating 16, while the secondary component 69 may be at least partially unmelted so that it retains at least a fraction of its initial particle morphology and contributes to the roughness of the resulting hydrophobic coating 16. Alternatively, in the case where the primary component 68 imparts hydrophobic properties, the primary component 68 may be at least partially unmelted during the thermal spray deposition process so that it retains at least a fraction of its initial particle morphology, while the secondary component 69 may be at least partially melted so that it sufficiently adheres to the substrate 12. However, it will be understood that the primary component 68 and the secondary component 69 may each contribute varying degrees of mechanical properties and hydrophobic properties as well. It will also be understood that any multi-length scale surface roughness in hydrophobic coatings produced with coating precursor composition (D) may result from the different particle sizes of the primary component 68 and the secondary component 69 and/or varying degrees of melting of the primary component 68 and the secondary component 69.

Figure 6:
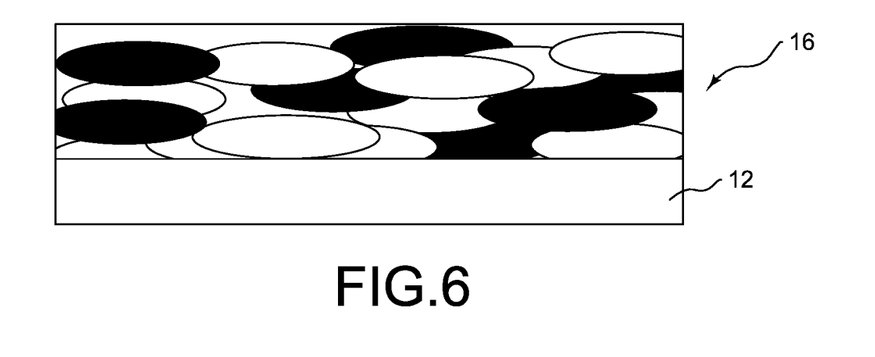
FIG. 6 is a schematic representation of a hydrophobic coating formed from coating precursor composition (C) of FIG. 5, constructed in accordance with the present disclosure.
Figure 7:
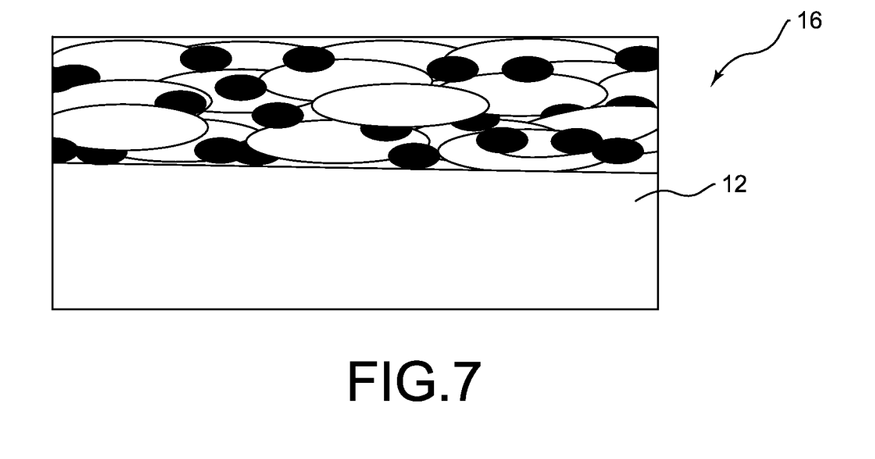
FIG. 7 is a schematic representation of a hydrophobic coating formed from coating precursor composition (D) of FIG. 5, constructed in accordance with the present disclosure.

FIG. 6 shows a schematic representation of a hydrophobic coating 16 prepared using coating precursor composition (C), wherein the primary component 66 and the secondary component 67 have different chemical identities but the same particle size and particle morphology. As a non-limiting possibility, the primary component 66 may be particles of poly ether ether ketone (PEEK) which may contribute mechanical properties to the hydrophobic coating 16, and the secondary component 67 may be particles of polytetrafluroethylene (PTFE) which has a lower surface energy and may contribute hydrophobic properties to the hydrophobic coating 16. FIG. 7 is a schematic representation of a hydrophobic coating 16 prepared using coating precursor composition (D), wherein the primary component 68 and the secondary component 69 have different chemical identities and different particle sizes/morphologies. As a non-limiting possibility, the primary component 68 may formed from PEEK particles and the secondary component 69 may be formed from PTFE particles, although several other combinations are also possible.

Figure 8:
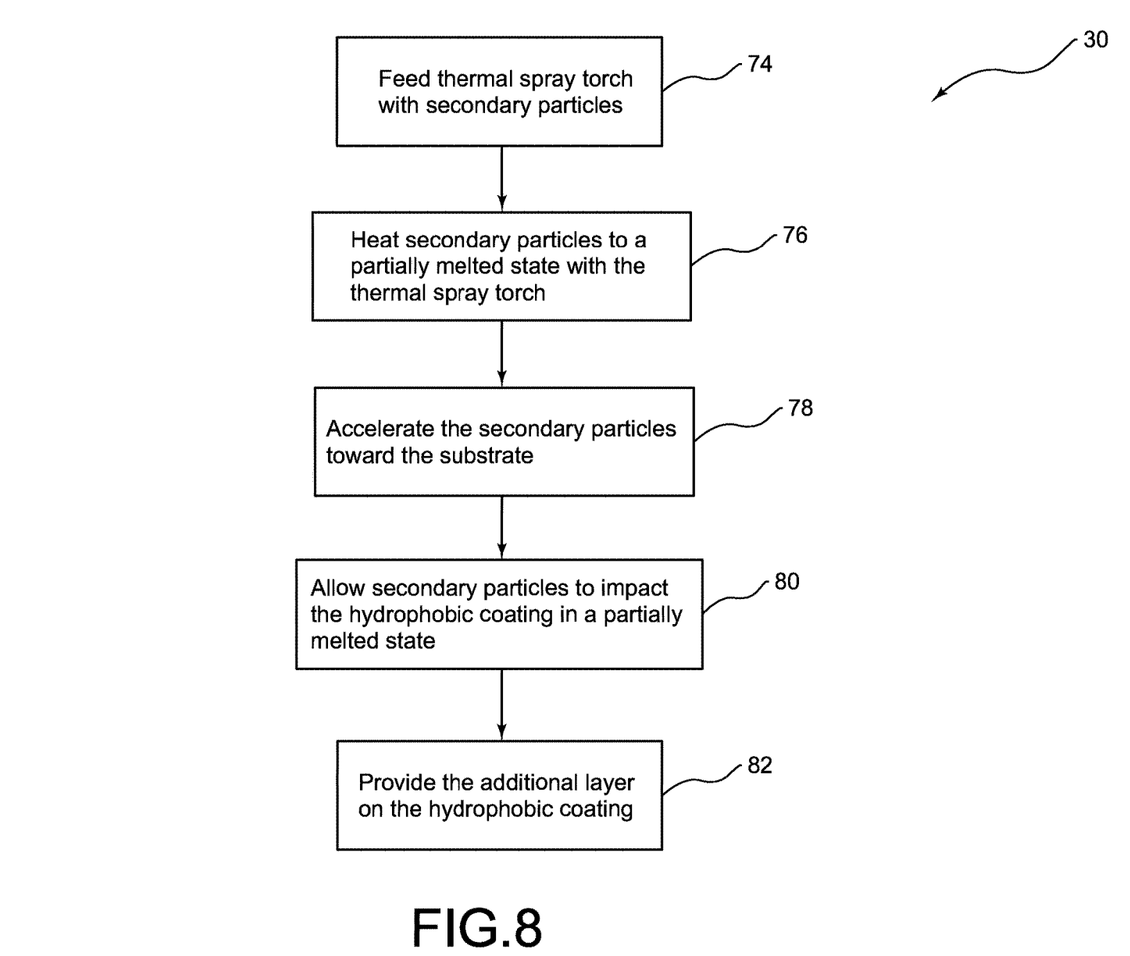
FIG. 8 is a flowchart illustrating a sequence of steps which may be involved in applying an additional layer over the hydrophobic coating using a thermal spray deposition process, in accordance with a method of the present disclosure.
Figure 9:
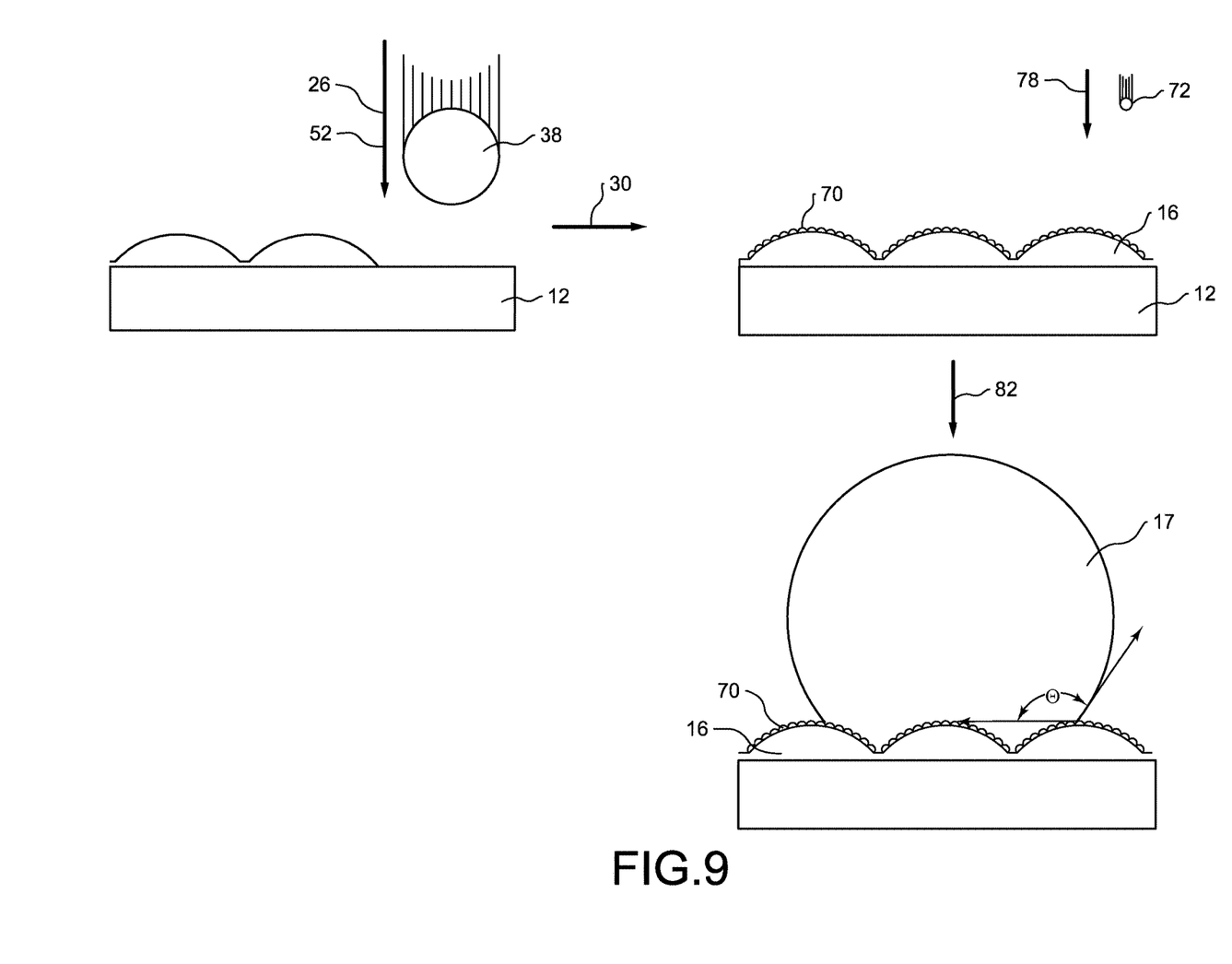
FIG. 9 is a schematic illustration of some of the steps of FIG. 8, in accordance with a method of the present disclosure.

Turning now to FIGS. 8-9, a method for applying one or more additional layers 70 on the hydrophobic coating 16 according to the optional block 30 is depicted. The block 30 may be carried out by first feeding the thermal spray torch 34 with secondary particles 72 according to a block 74, as described above (i.e., block 36). The secondary particles 72 may have a lower surface energy and/or a particle size that is at least one order of magnitude smaller than the coating precursor particles 38 used to produce the hydrophobic coating 16. The secondary particles 72 may then be heated with the thermal spray torch 34 to at least a partially melted state, accelerated towards the substrate 12, and allowed to impact the substrate 12 in a partially melted state in which a fraction of the initial particle morphology of at least some of the secondary particles 72 is retained to provide the additional layer 70 on the hydrophobic coating 16 (blocks 76, 78, 80, and 82). As described above for the deposition of the coating precursor 38, the degree of melting of the secondary particles 72 during the blocks 76, 78, and 80 may be tuned by varying the thermal spray deposition parameters such as the fuel-to-oxygen ratio, the total fuel and oxygen volume, the fuel and oxygen feed rates, the stand-off distance (d), and/or the raster speed of the thermal spray torch 34. Namely, the thermal spray deposition parameters may be tuned to ensure that the secondary particles 72 are melted enough to promote adhesion to the hydrophobic coating 16, but not fully melted such that the at least some of the secondary particles 72 retain a fraction of their initial particle morphology to enhance surface roughness.

The resulting hydrophobic coating 16 may have an enhanced hydrophobicity (as shown by a higher water contact angle (θ) with a water droplet 17) as a consequence of the lower surface energy provided by the secondary particles 72 and/or the enhanced surface roughness provided by the smaller secondary particles 72. For example, if the secondary particles 72 are at least an order of magnitude smaller than the particles of the coating precursor 38, the additional layer 70 may introduce multi-length scale surface roughness into the hydrophobic coating 16. To further enhance the degree of multi-length scale surface roughness and hydrophobicity of the coating 16, subsequent additional layers 70 may be deposited on the hydrophobic coating 16 by repeating the method of FIGS. 8-9, wherein each subsequent additional layer 70 has a particle size that is smaller than the particle size of the previous layer.

As the additional layer(s) 70 may only be used to enhance the hydrophobicity of the hydrophobic coating 16, the additional layer(s) 70 may each be a very thin layer, such as a monolayer (e.g., with single particle thickness), that is substantially thinner than the hydrophobic coating 16. As one possible arrangement, each additional layer 70 may be a monolayer of the secondary particles 72 covering between about 70% to about 150% of the surface of the hydrophobic coating 16, although the surface coverage of the secondary particles 72 may extend beyond this range in some circumstances. Accordingly, the additional layer(s) 70 may be at least partially transparent such that the hydrophobic coating 16 may be visible through the additional layer(s) 70.

EXAMPLES

The method of the present disclosure has been used to produce hydrophobic coatings from thermoplastic polymer powders such as polyether ether ketone (PEEK). Specifically, HVOF thermal spray equipment was used to deposit PEEK powders having a 50 micrometer particle diameter according to the method of FIGS. 3-4. Since typical HVOF thermal spray processes heat particles to temperatures in excess of 1000°, the HVOF thermal spray torch was set to a low fuel-to-oxygen ratio (~0.65) and higher stand-off distances (d) to reduce total heat input into the PEEK particles and prevent complete melting and/or burning of the polymer particles. Table I shows the mean roughness depth ($R_z$), the average roughness ($R_a$), and the relative oxide content of PEEK coatings produced by HVOF thermal spraying at various stand-off distances (d). As can be seen from the table, the roughness of the PEEK coatings increases with increasing stand-off distances (d) due to decreased heating/melting of the PEEK particles at higher stand-off distances (d). In contrast, lower stand-off distances (d) leads to higher oxide contents (i.e., lower surface energies) due to increased heating of the deposited film which enhances the oxide content. Thus, the thermal spray parameters may be varied to control the roughness, the oxide content, and the ultimate degree of hydrophobicity of PEEK coatings.

TABLE 1

PEEK coating properties as a function of HVOF torch stand-off distances at a 0.65 fuel-to-oxygen ratio. $R_z$ (mean roughness depth) is the vertical distance from the highest peak to the lowest valley. $R_a$ (average roughness) is the average length between the peaks and the valleys.

| Stand-off (in) | $R_z$ (µin) | $R_a$ (µin) | Oxide Content |
|---|---|---|---|
| 14 | 3920 ± 210 | 673 ± 29 | None |
| 10 | 3930 ± 190 | 647 ± 29 | Low |
| 6 | 3680 ± 230 | 610 ± 36 | Moderate |
| 4 | 1750 ± 190 | 263 ± 12 | Very High |

Figure 10:
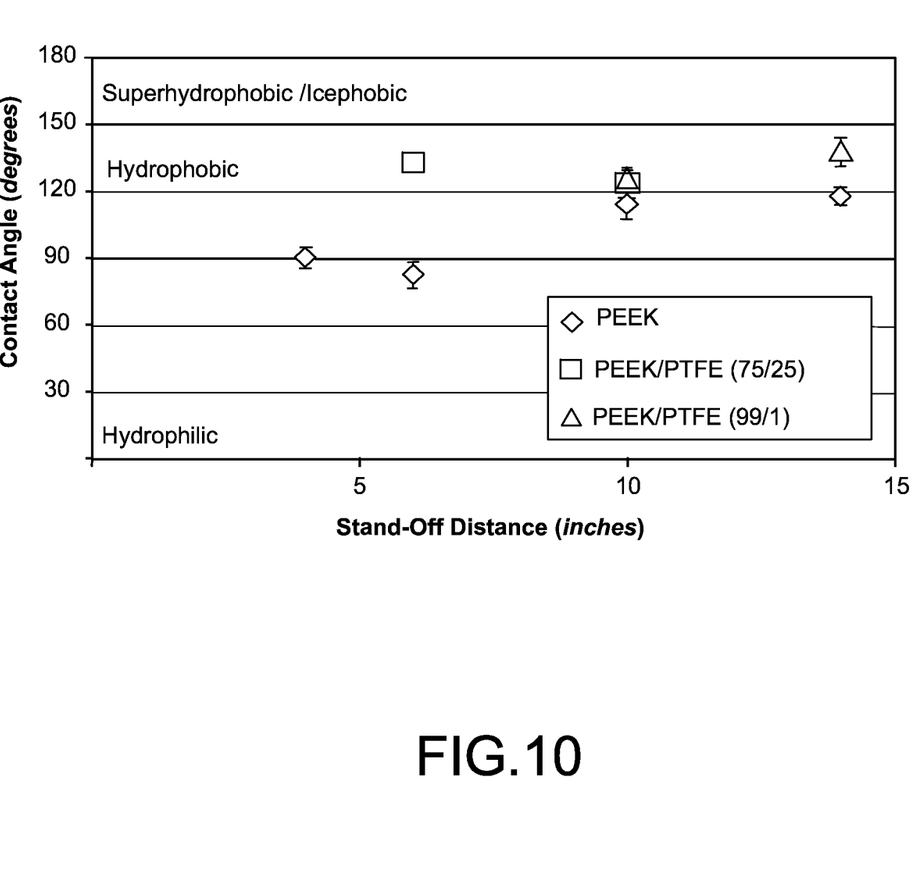
FIG. 10 is a data plot of water contact angle (θ) versus stand-off distance (d) between the substrate and the thermal spray apparatus for various polymeric hydrophobic coatings prepared according to the methods of the present disclosure.

Applicants have also investigated the hydrophobicity (measured by the water contact angle (θ)) of various polymer powder compositions produced at varying HVOF torch stand-off distances (d). In particular, FIG. 10 shows the water contact angle (θ) of various polymer-based coatings as a function of stand-off distance (d) at a fuel-to-oxygen ratio of ~0.65. As can be seen from the plot, the hydrophobicity (i.e., water contact angle (θ)) of pure PEEK coatings produced from 50 micrometer PEEK particles generally increases with increased stand-off distances (d) due to decreased heating/melting and roughness of the deposited PEEK particles. Similar trends were observed with 50 micrometer PEEK particles doped with 50 micrometer polytetrafluoroethylene (PTFE) particles, with water contact angles (θ) approaching the superhydrophobic/icephobic region at higher stand-off distances (d). The PEEK and PTFE mixtures fall into the category of coating precursor composition (C) (e.g., different chemical identities with the same particle size), with the PEEK particles providing mechanical properties and the PTFE particles providing hydrophobic properties due to its lower surface energy. Interestingly, doping of the PEEK particles with as low as 1% PTFE (99/1 PEEK/PTFE) was sufficient to observe an enhancement in hydrophobicity over coatings formed from pure PEEK particles.

Figure 11:
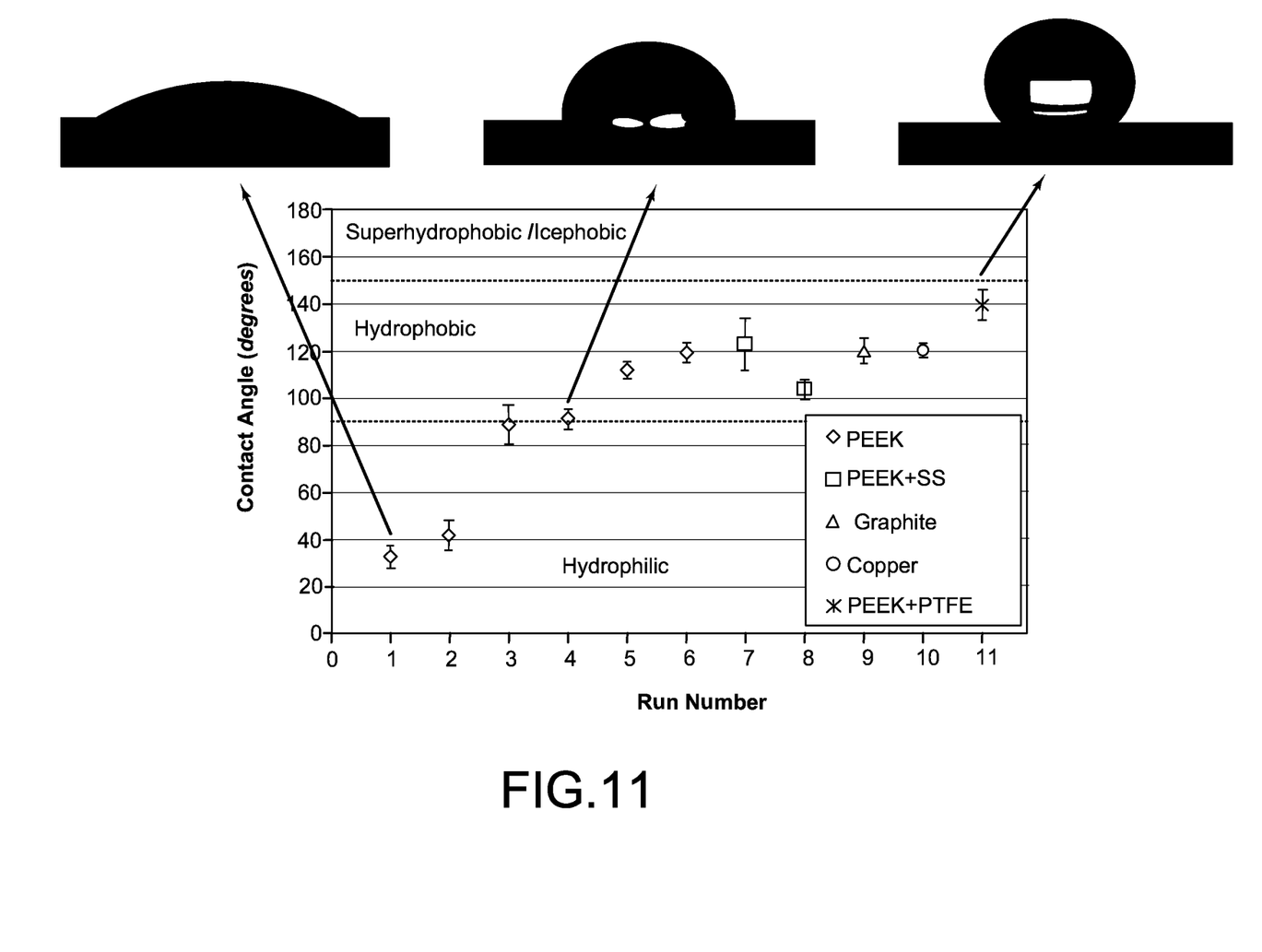
FIG. 11 is a data plot showing the water contact angles (θ) of various hydrophilic, hydrophobic, and near-superhydrophobic/icephobic coatings prepared under varying thermal spray conditions according to the methods of the present disclosure.

In addition, as shown in FIG. 11, applicants have produced coatings with water contact angles (θ) in the hydrophobic and near superhydrophobic/icephobic region from powders of polymer and metal particles (PEEK+stainless steel (SS)) and metal particles (copper) by thermal spray depositions. In particular, control over the degree of hydrophobicity of the resulting coatings shown in FIG. 11 was achieved by varying different thermal spray parameters such as stand-off distance (d), number of passes over the substrate, fuel and oxygen fuel rates, and fuel-to-oxygen ratio (see Table 2 below which shows the thermal spray parameters for each run number shown in FIG. 11).

polymers loaded with nanoparticles, etc.) may perform as coating precursors as they may be designed to have good adhesion as well as multi-length scale roughness. It is also noted that the thermal spray coatings disclosed herein may also be used to impart other types of properties to substrate surfaces as well such as, but not limited to, anti-fouling properties, conductive properties, and/or biocidal properties. For example, coatings formed from metal nanoparticles may impart conductive properties or biocidal properties (e.g., copper nanoparticles), while certain types of polymers (e.g., zwitterionic polymers, etc.) may be used to impart anti-fouling properties.

INDUSTRIAL APPLICABILITY

In general, it can therefore be seen that the technology disclosed herein has industrial applicability in a variety of settings such as, but not limited to, industrial applications which may benefit from components having hydrophobic and superhydrophobic/icephobic surfaces. In contrast with other methods for producing hydrophobic and superhydrophobic/icephobic coatings, the technology disclosed herein relies solely on thermal spray deposition methods to produce hydrophobic and superhydrophobic/icephobic coatings from a range of starting precursor powders, including polymeric powders. The methods of the present disclosure may be used to apply durable hydrophobic and superhydrophobic/icephobic coatings on a variety of industrial products, even products with large surface areas (e.g., marine equipment, bridges, pipes, aircraft wings, etc.), at high deposition rates and under atmospheric conditions. Although thermal spray

TABLE 2

HVOF thermal spray parameters for the thermal spray run numbers shown in FIG. 11.

| run | particle | particle size (μm) | kerosene flow rate (GPH)[a] | $O_2$ flow rate (SCFH)[b] | number of passes[c] | stand-off (in) | fuel/ oxygen |
|---|---|---|---|---|---|---|---|
| 1 | PEEK | 50 | 1.3 | 733 | 1 + 5 + 1 | 6 | 0.83 |
| 2 | PEEK | 50 | 1.8 | 600 | 1 + 5 | 6 | 0.83 |
| 3 | PEEK | 50 | 1.8 | 733 | 1 + 2 | 6 | 0.83 |
| 4 | PEEK | 50 | 1.8 | 733 | 1 + 5 | 4 | 0.68 |
| 5 | PEEK | 1:1 10/50 | 1.8 | 733 | 1 + 5 | 10 | — |
| 6 | PEEK | 50 | 1.3 | 733 | 1 + 5 | 14 | 0.68 |
| 7 | PEEK/SS | 1:1 50/10-20 | 1.8 | 733 | 1 + 1, 1 + 2, 1 + 7 | 10 | — |
| 8 | PEEK/SS | 1:1 50/20-30 | 1.8 | 733 | 1 + 5 + 1 | 10 | — |
| 9[d] | Graphite | — | — | — | — | — | — |
| 10[e] | Copper | — | — | — | — | — | — |
| 11 | PEEK/ PTFE | 1:1 50/10 | 1.8 | 733 | 1 + 5 | 14 | — |

[a]GPH = gallons per hour;
[b]SCFH = standard cubic feet per hour;
[c]The number of passes alternates between number of passes with 'powder off' and number of passes with 'powder on', and a comma indicates a pause where the torch is turned off (e.g., 1 + 5 + 1 means one pass with 'powder off', five passes with 'powder on', and one pass with 'powder off');
[d]Thermal spray was not involved in generating the graphite coating. A steel surface was coated with a carbon black lubricant from an aerosol can and was baked in an oven to drive off the solvent;
[e]The copper coating was generated by twin wire arc thermal spray deposition.

Thus, the disclosure herein may be used to produce hydrophobic and superhydrophobic/icephobic coatings from a variety of precursor materials such as, but not limited to, polymer powders, metal or metal alloy powders, polymer powder and metal/metal alloy powder mixtures, and polymer powder and polymeric or metal/metal alloy nanoparticle mixtures by tuning the thermal spray deposition parameters. In this regard, it is noted that composite materials (e.g., technologies are typically used to apply smooth metallic, ceramic, or cermet coatings, the present disclosure implements thermal spray deposition processes to produce roughened/hydrophobic coatings by controlling the degree of melting of the coating precursors such that at least a fraction of the initial particle morphology is retained upon impact with the substrate. Specifically, the degree of melting and the roughness of the resulting coating may be tuned by varying the thermal spray deposition parameters such as the fuel-to-oxygen ratio, the stand-off distance (d), the fuel and oxygen feed rates, and the raster speed. It is expected that the technology disclosed herein may find wide industrial applicability in a wide range of areas such as, but not limited to, aerospace, marine, power, transportation, construction, and defense industries.

What is claimed is:

1. A method for forming a polymeric hydrophobic coating on a substrate by a high velocity oxygen fuel (HVOF) thermal spray deposition process, comprising:
    feeding a HVOF thermal spray torch with a coating precursor, the coating precursor including polymeric particles of a polymer powder, the polymeric particles having an initial particle morphology;
    heating the polymeric particles with the HVOF thermal spray torch;
    controlling a heating temperature of the HVOF thermal spray torch to obtain a mixture of partially melted polymeric particles, which retain a fraction of the initial particle morphology, and fully unmelted polymeric particles, which fully retain the initial particle morphology, wherein controlling the heating temperature of the HVOF thermal spray torch comprises tuning at least one deposition parameter of the HVOF thermal spray process, including setting a fuel-to-oxygen ratio of the HVOF thermal spray torch to less than one to prevent complete melting and/or burning of the polymeric particles;
    accelerating the polymeric particles towards the substrate using the HVOF thermal spray torch; and
    impacting the substrate simultaneously with the partially melted polymeric particles and the fully unmelted polymeric particles to form the polymeric hydrophobic coating with an average surface roughness of between about 1 nanometer and about 100 micrometers.

2. The method of claim 1, wherein the coating precursor comprises a powder having an average particle size of between about 10 nanometers and about 100 micrometers.

3. The method of claim 1, wherein tuning the at least one deposition parameter further includes tuning an oxygen feed rate and a fuel feed rate of the HVOF torch.

4. The method of claim 1, wherein tuning the at least one deposition parameter further includes tuning a stand-off distance between the HVOF thermal spray torch and the substrate.

5. The method of claim 1, further comprising heating the polymeric hydrophobic coating subsequent to impacting the substrate with the polymeric particles, thereby to increase an oxide content of the polymeric hydrophobic coating.

6. The method of claim 1, wherein the coating precursor consists of a single component having a single chemical identity with a single particle size and single particle morphology.

7. The method of claim 1, wherein the coating precursor consists of a primary component and a secondary component having a smaller thermal mass than the primary component, wherein the primary component and the secondary component have the same chemical identity but a different particle size and a different particle morphology, and wherein coating precursor consists of more than 50 weight percent of the primary component.

8. The method of claim 1, wherein the coating precursor consists of a primary component and a secondary component, wherein the primary component and the secondary component have a different chemical identity and a same particle size and a same particle morphology, and wherein the coating precursor consists of more than 50 weight percent of the primary component.

9. The method of claim 1, wherein the coating precursor consists of a primary component and a secondary component, wherein the primary component and the secondary component have a different chemical identity and a different particle size and a different particle morphology, and wherein the coating precursor consists of more than 50 weight percent of the primary component.

10. The method of claim 1, further comprising applying an additional layer on the hydrophobic coating by a HVOF thermal spray deposition process comprising:
    feeding the HVOF thermal spray torch with secondary particles having an initial particle morphology, the secondary particles having at least one of a lower surface energy and a smaller particle size than the particles of the coating precursor;
    heating the secondary particles with the HVOF thermal spray torch to cause the secondary particles to at least partially melt;
    accelerating the secondary particles towards the substrate using the HVOF thermal spray torch; and
    forming the additional layer on the hydrophobic coating by allowing the secondary particles to impact the substrate in a partially melted state in which a fraction of the initial particle morphology of at least some of the secondary particles is retained.

11. The method of claim 10, wherein the additional layer is a monolayer that covers between about 70% and about 150% of a surface of the hydrophobic coating.

12. The method of claim 10, wherein the secondary particles have a particle size that is at least one order of magnitude smaller than the particles of the coating precursor.

13. The method of claim 10, wherein the hydrophobic coating includes the additional layer, and wherein the hydrophobic coating exhibits multi-length scale surface roughness.

14. A method of forming a polymeric hydrophobic coating on a substrate by a high velocity oxygen fuel (HVOF) thermal spray deposition process, comprising:
    feeding a HVOF thermal spray torch with polymeric particles, the polymeric particles including at least 50 weight percent of polyether ether ketone (PEEK) particles, the polymeric particles having an initial particle morphology;
    heating the polymeric particles with the HVOF thermal spray torch;
    controlling a heating temperature of the HVOF thermal spray torch to obtain a mixture of partially melted polymeric particles, which retain a fraction of the initial particle morphology, and fully unmelted polymeric particles, which fully retain the initial particle morphology, wherein controlling the heating temperature of the HVOF thermal spray torch comprises adjusting deposition parameters of the HVOF thermal spray deposition process including adjusting a fuel-to-oxygen ratio of the HVOF thermal spray torch to between about 0.5 to about 0.9, adjusting a fuel feed rate of the HVOF thermal spray torch to between about 1.5 to about 2.2 gallons per hour (GPH), and adjusting an oxygen feed rate of the HVOF thermal spray torch to between about 600 to about 900 standard cubic feet per hour (SCFH);
    accelerating the polymeric particles toward the substrate using the HVOF thermal spray torch; and
    impacting the substrate simultaneously with the partially melted polymeric particles and the fully unmelted polymeric particles to form the polymeric hydrophobic coating with an average surface roughness of between about 1 nanometer and about 100 micrometers, the coating further having a water contact angle of 90° or more.

15. The method of claim 14, further comprising heating the polymeric hydrophobic coating subsequent to impacting the substrate with the polymeric particles, thereby to increase an oxide content of the polymeric hydrophobic coating.

* * * * *